Oct. 13, 1953 A. J. SAVARD 2,655,090
THERMAL SHROUD FOR ENGINE MOUNTS
Filed Aug. 25, 1949
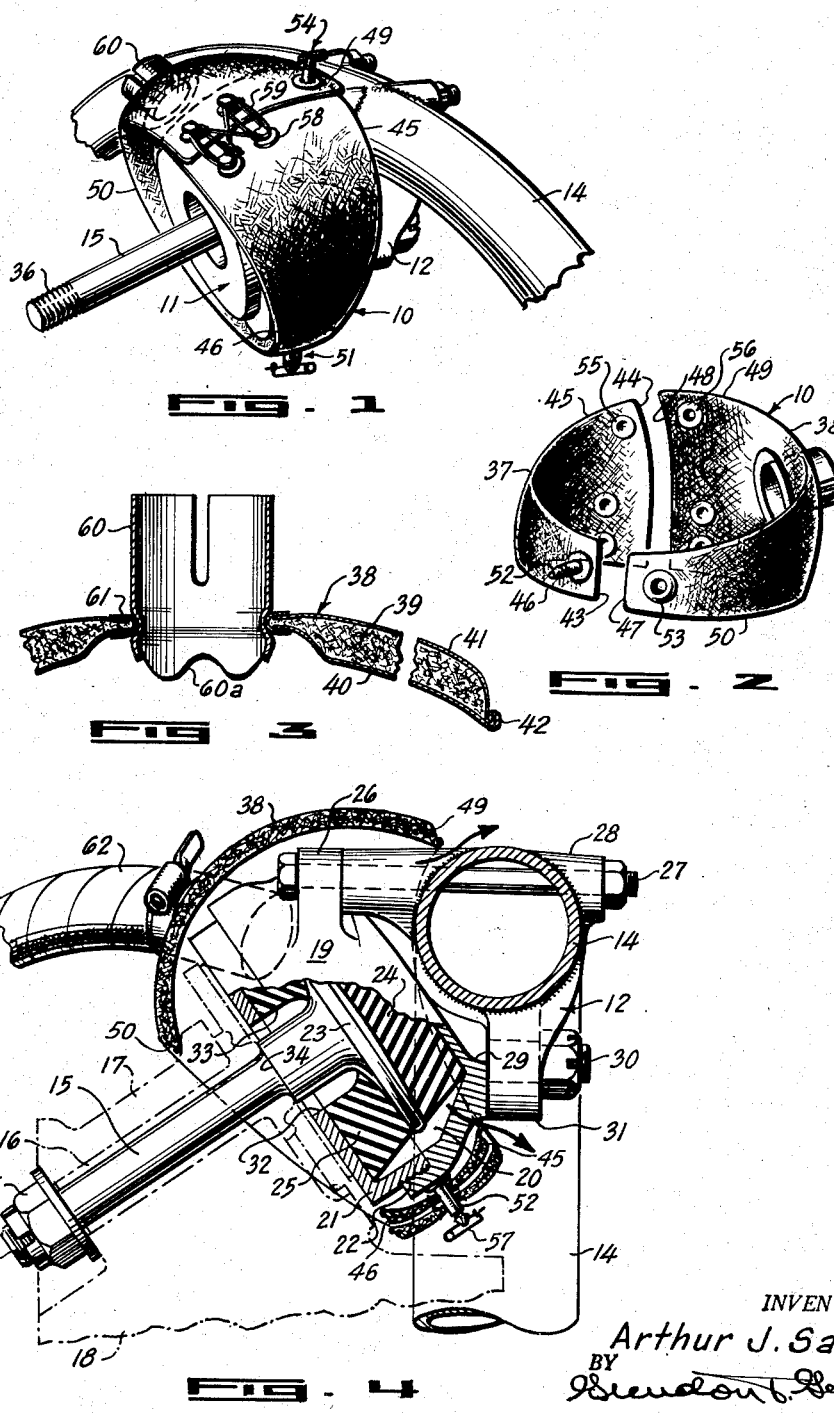
INVENTOR.
Arthur J. Savard
BY Patented Oct. 13, 1953

2,655,090

UNITED STATES PATENT OFFICE 2,655,090

THERMAL SHROUD FOR ENGINE MOUNTS

Arthur J. Savard, San Diego, Calif., assignor to Consolidated Vultee Aircraft Corporation, San Diego, Calif., a corporation of Delaware Application August 25, 1949, Serial No. 112,238

5 Claims. (Cl. 98—1)

The invention relates to an improved means for reducing the operating temperatures of engine shock mounts of the type that embody elements formed of rubber or the like to isolate vibration from the engine supporting structure. More particularly the invention is characterized as a light weight, two-piece shroud assembly adapted to surround and be secured to engine shock mounts of the above type, composed of fiber-glass batt enclosed in an envelope of metal foil to provide an impervious container having high insulating qualities.

In modern power plant designs wherein air-cooled engines of the radial type are employed, as in aircraft, it is common practice to support the engine from a firewall or other supporting structure by means of a mounting frame consisting generally of a tube ring conforming to the rear portions of the engine, having an arrangement of tubular braces welded thereto and terminating in lugs that are suitably formed for attachment to the structure. The engine casing is provided with a number of circumferentially spaced mounting lugs which cooperate with similarly spaced attachment fittings welded to the tubular ring of the mounting frame, and afford attachments for the engine. In installations of this type, it is usual to provide a so-called "shock mount" at each of the attachment points of the engine to the mount which are formed with a bolt or stud for engaging the mounting lug of the engine, and means for attaching the shock mount to the attachment fittings on the tubular ring of the engine mount. "Shock mounts" of this type are so-called because they function to prevent the transmission of the vibration and shocks of the engine from the engine mount and isolate them from the mounting structure. The most modern shock mounts of this type comprise an element formed of rubber or similar resilient material interposed between the stud forming the attachment with the engine, and the attachment fitting to the engine mount ring. By this arrangement, the entire weight and dynamic loads of the engine are supported by the resilient rubber elements of the shock mounts which additionally serve to absorb the engine vibrations and prevent their transmission to the supporting structure.

In aircraft tractor engine installations the shock mounts are located downstream in relation to the cooling air and in the general path of the heated air as it is passed through the cowled power plant, and overboard. They are therefore subjected to relatively high ambient temperatures that materially decrease the fatigue resistance of their rubber elements and result in restricted service life. The effect of elevated temperatures in reducing the fatigue resistance of rubber is especially critical if the rubber is under stress, as is the case in the present application where the engine weight is supported directly by the rubber elements of the shock mount.

The principal object of the present invention is to provide a simple, light, and thermally efficient means of reducing the operating temperatures of shock mounts as above described to the end of increasing their fatigue resistance and prolonging their service life.

A further object of the invention is to provide a light and effective two-piece thermal shroud adapted to surround and be secured to a shock mount of the type under consideration to maintain its operating temperature at reduced values.

Still another object of this invention is to provide a thermal shroud for shock mounts which may be readily installed or removed in order to facilitate inspection and servicing of the mount.

Other objects and advantages of the invention will be apparent from the following specification and the drawings forming a part hereof, in which:

Fig. 1 is a perspective view of the thermal shroud of the present invention assembled around an engine shock mount of the type under consideration, Fig. 2 is a view of the two components of the thermal shroud as they appear prior to assembly, Fig. 3 is a sectional view showing the cross-sectional structure of the shroud and the detail of means that are provided to cause circulation of cool air within it, and Fig. 4 is a sectional view through a shock mount illustrating the manner in which the shroud surrounds and shields the elements thereof.

The thermal shroud assembly shown in the drawings constitutes a preferred embodiment of the invention, however, it will be apparent from the following description that the dimensions and form of the device may be considerably varied to accommodate engine shock mounts of different types and sizes without departing from the scope and principles of the invention.

In Fig. 1 the thermal shroud 10 forming the basis for the invention is illustrated in assembled relation with a shock mount 11 which is bolted to an attachment fitting 12 forming a part of an engine supporting structure 14. While the character of the engine supporting structure 14 may obviously be varied from that shown without affecting the utility of the invention, for illustrative purposes, it is represented as a part of a tubular ring, as generally employed in connection with the mounting of radial air-cooled aircraft engines, the diameter of the ring being such as to conform to and encircle the rear portions of the engine, and being itself a part of a framework or engine mount which is fastened to the firewall or other appropriate structure of an aircraft. In such an arrangement, a plurality of shock mounts 11 are usually provided around the periphery of the supporting structure or ring 14, each being provided with a threaded stud 15 which is adapted to engage a hole 16 in a suitable mounting lug 17 (shown dotted in Fig. 4) forming a part of the engine case 18 or structure. The engine is thus supported entirely by means of the shock mounts 11 from the supporting ring 14.

The shock mount 11, as most clearly shown in Fig. 4 consists essentially of a body member 19 counterbored to form a chamber or cavity 20, a compression ring 21 externally threaded to mate with and engage threads 22 on the body member 19, a stud 15 having an enlarged circular head 23 adapted to be positioned within the cavity 20 of the body member 19, and a pair of generally cylindrical rubber blocks 24 and 25 disposed respectively between the upper surface of the head 23 and the body member 19 and between the lower surface of the head 19 and the compression ring 21.

On its outer surface, the body member 19 is provided with a pair of projecting lugs 26 which are drilled to accommodate bolts 27 for assembly with tubular extensions 28 of the attachment fitting 12, and a reinforced boss 29 formed integrally with the body member 19 to support a stud 30 which mates with a drilled lug 31 of the attachment fitting 12. The bolts 27 and stud 30 serve to secure the shock mount 11 to the supporting ring 14 and locate it thereto.

In general practice the shock mounts 11 are positioned around the engine mount ring 14 in such a manner that the axes of the studs 15 intersect the central axis of the engine at a common point at or near its center of gravity.

The compression ring 21 and the lower rubber block 25 are formed with axial clearance holes 32 and 33 respectively, through which the stud 15 projects, so that it is radially unrestrained therein. The portion of the stud 15 adjacent the lower side of the enlarged head 23 is provided with a shoulder 34, by means of which the engine mounting lug 17 is secured to the stud 15, when the nut 35 is taken upon the threaded end 36 thereof.

The rubber blocks 24 and 25 are, in practice, vulcanized or otherwise bonded to the upper and lower faces respectively of the enlarged head portion 23, so that when the assembly is positioned with the cavity 20, and compressed therein by means of the compression ring 21, a load imposed on the stud 15 is transmitted to the body member 19 and its supporting members, only through the rubber blocks 24 and 25. Similarly the rubber blocks 24 and 25 absorb the vibratory effects of dynamic loads impressed on the stud 15 and isolate them from the body of the shock mount and its support.

Even with selection of the most fatigue-resistant rubbers or synthetics available, experience has shown that the resilient elements of shock mounts as above described have a relatively short service life and require frequent replacement as a result of the high stresses to which they are subjected. This condition is aggravated since shock mounts of the type under consideration are of necessity used in close proximity to the engine and are subjected to ambient temperatures of from 100° to 150° C. which limits their service life to approximately 200 hours. By the use of the present invention, the shock mounts are shielded from the high ambient temperatures around the engine, and by re-circulation of cool air within the shroud contemplated by the invention and the shock mount, the operating temperature of the latter is reduced by between 35° to 45° C. which results in increasing their fatigue resistance and prolonging their service life by as much as three or four times.

Referring to Fig. 2, the thermal shroud 10 of the invention is illustrated as comprising a pair of shell-like segmental elements 37 and 38 adapted to be fastened together around the engine shock mount 11 to form a generally hemispherical shield or insulator for maintaining the shock mount 11 at a lower temperature than that of the ambient air in which it is located.

While a wide variety of materials are suitable for the sectional construction of the elements 37 and 38, one of the main objectives of the invention is to provide a thermal shroud that is light, durable, and highly efficient as a thermal insulator and to meet these specifications, I have found it particularly desirable to form the elements of the shroud 10 of a core 39 of 2" thick commercial grade glass fibre batt compressed to about ½" between inner and outer skins 40 and 41 respectively of aluminum foil of the order of .005" in thickness. All of the lateral edges of the elements 37 and 38 are sealed by rolling over the edges of the outer skin 41 within the edges of the inner skin 40 to form a peripheral bead 42.

In this construction, the compressed glass fibre provides a highly efficient thermal insulator and the light, sealed metallic envelope formed by the skins 40 and 41 provides a serviceable container which is impervious to water, oil, or fuel.

The segmental element 37 is roughly formed as a portion of a hemisphere, having a pair of circumferential edges 43 and 44 respectively and upper and lower edge portions 45 and 46. The element 38 is similarly shaped, having edge portions 47 and 48 adapted to respectively overlap the edges 43 and 44 of the element 37 when assembled therewith, and fastening means are provided therebetween to facilitate the assembly of the thermal shroud 10 around the shock mount 11, and secure it in position. An upper curved edge 49 of the segmental element 38 conforms in assembly with the upper edge 45 of the element 37 to form an opening loosely accommodating the mount fitting 12 and shock mount body portion 19. A lower edge portion 50 of the element 38 conforms in assembly with the edge portion 46 of the element 37 and forms, in assembly, an opening accommodating the compression ring 21 of the shock mount 11 and the surrounding structure of the engine mounting lug 17.

While many types of available fastening means may be employed to secure the two segmental elements 37 and 38 together to form the shroud 10, in the embodiment shown, a post type fastener 51 is provided to secure the edges 43 and 47 together, the stud 52 of the fastener 51 being secured near the edge 43 and the corresponding grommet 53 being inserted adjacent the edge 47; and a second stud type fastener 54 is provided adjacent the overlapping edges 44 and 48 below the edges 45 and 49, the stud 55 of the fastener being secured to the element 37 and its corresponding grommet 56 being inserted in the element 38. In assembly, with the grommet 53 positioned on the stud 52, and the grommet 56 positioned on the stud 55, safety pins 57 are inserted through transverse holes in the outer ends of the studs 52 and 55, thus positively holding the segments 37 and 38 in fixed relationship. Pairs of eyelets 58 are provided on either side of the edges 44 and 48 adjacent the edges 46 and 50 respectively. On installation, a lacing 59 is employed in connection with the eyelets 58 to "pull down" the opening formed by the edges 46 and 50 around the forward edges of the shock mount 11 to effectively seal it against the entry of heated air, and to secure the shroud 10 in position upon it.

Although the shroud 10 is an efficient insulator, the air within it would eventually reach ambient temperature of the air surrounding it, unless a means is provided for circulation of air within it. To accomplish this a hose connector 60 comprising a hollow tube is secured by means of a grommet 61 through the wall of the element 38 in a suitable location for connection to a hose or blast tube 62 whose external end is disposed upstream in the air in front of the engine or around its cowl, so as to direct a stream of cooler ram air i. e., air under pressure created at the exposed end of the tube 62 by reason of the relative movement of the airstream between the shroud 10 and the shock mount 11 during operation. The lower end 60ª of the hose connector 60 is serrated to prevent cutting off the flow of cooling air due to contact of the hose connector 60 against the shock mount 11. Since the opening formed by the edges 45 and 49 of the shroud 10 conforms only approximately to the shock mount 11 and its supporting structure, the excess cool air from the blast tube 62 is permitted to escape rearwardly from the shroud as indicated by arrows in Fig. 4 and thus creates a circulation within it.

As thus described, the invention is characterized as a thermal shroud adapted to surround engine shock mounts to maintain the operating temperature of the shock mount below that of the ambient atmosphere consisting of a lightweight fibrous core having high thermal insulation characteristics enclosed between inner and outer impervious skins, and being provided with means for the circulation of cool air between the shroud and the shock mount.

While certain preferred embodiments of the invention have been specifically disclosed herein, it will be understood that the invention is not necessarily limited thereto, and that many variations will be apparent without departing from the essence of the invention and the scope of the folowing claims.

Having thus described my invention, what I claim as new and desire to secure by Letters Patent is:

1. A thermal insulating assembly for engine shock mounts having a first attaching means to connect said shock mount to an engine and a second attaching means to connect said shock mount to a supporting structure, comprising an impervious shroud of insulating material shaped to substantially surround said shock mount and to lie in partially spaced relationship thereto and having edges defining a pair of spaced openings, each opening accommodating one of said attaching means, inlet means associated with said shroud for the admission of cooling air into the space between said shroud and said shock mount, and adjustable means associated with the edges defining one of said openings adapted to tighten said shroud around said shock mount to secure it thereto and to support said shroud therefrom, the other of said openings affording an outlet means for said shroud for the exhaust of cooling air therefrom.

2. A thermal shroud of insulating material adapted to substantially surround and enclose an engine shock mount having a first edge defining an adjustable opening accommodating one portion of said shock mount, fastening means associated with said first edge to secure said edge to said shock mount to support said shroud in partially spaced relation therefrom, and inlet means carried by said shroud for passing cooling air through the wall of said shroud for circulation between said shroud and shock mount, said shroud having a second edge defining an exit opening for exhausting said cooling air.

3. A thermal shroud adapted to substantially surround and enclose an engine shock mount, said shroud comprising a fibrous core of high insulating efficiency enclosed and sealed between inner and outer metallic skins and having a first edge defining an adjustable opening accommodating one portion of said shock mount, fastening means associated with said first edge to secure said edge to said shock mount to support said shroud in partially spaced relation therefrom, and inlet means carried by said shroud for passing cooling air through the wall of said shroud for circulation between said shroud and shock mount, said shroud having a second edge defining an exit opening for exhausting said cooling air.

4. A thermal shroud comprising a pair of segmental elements formed of insulating material adapted in assembly to substantially surround and enclose an engine shock mount, said segmental elements in assembly providing a first edge which defines an adjustable opening accommodating one portion of said shock mount, fastening means on each of segmental elements for securing said first edge to said shock mount to support said shroud in partially spaced relation therefrom, and inlet means carried by one of said segmental elements for admitting cooling air to the space between said shroud and shock mount, said segmental elements providing a second edge which defines an exit opening for exhausting the cooling air from said space.

5. A thermal shroud comprising a pair of segmental elements formed of glass fibre batt compressed between and sealed within metal foil skins adapted in assembly to substantially surround and enclose an engine shock mount, said segmental elements in assembly providing a first edge which defines an adjustable opening accommodating one portion of said shock mount, fastening means on each of segmental elements for securing said first edge to said shock mount to support said shroud in partially spaced relation therefrom, and inlet means carried by one of said segmental elements for admitting cooling air to the space between said shroud and shock mount, said segmental elements providing a second edge which defines an exit opening for exhausting the cooling air from said space.

ARTHUR J. SAVARD.

References Cited in the file of this patent

UNITED STATES PATENTS

| Number | Name | Date |
|---|---|---|
| 1,434,610 | Gunn | Nov. 7, 1922 |
| 2,078,116 | Arndt | Apr. 20, 1937 |
| 2,261,955 | Browne | Nov. 11, 1941 |
| 2,325,955 | Higgins | Aug. 3, 1943 |
| 2,493,303 | McCullough | Jan. 3, 1950 |

FOREIGN PATENTS

| Number | Country | Date |
|---|---|---|
| 482,809 | Great Britain | Apr. 5, 1938 |